United States Patent
Takeuchi et al.

(10) Patent No.: US 8,712,255 B2
(45) Date of Patent: Apr. 29, 2014

(54) OPTICAL RECEIVER AND OPTICAL TRANSFER APPARATUS

(75) Inventors: Hiroshi Takeuchi, Tokyo (JP); Kohei Mandai, Tokyo (JP); Koji Takatori, Tokyo (JP); Yasuyuki Fukashiro, Yokohama (JP); Hideaki Tsushima, Komae (JP)

(73) Assignee: Hitachi, Ltd., Tokyo (JP)

( * ) Notice: Subject to any disclaimer, the term of this patent is extended or adjusted under 35 U.S.C. 154(b) by 283 days.

(21) Appl. No.: 13/113,591

(22) Filed: May 23, 2011

(65) Prior Publication Data

US 2011/0293270 A1 Dec. 1, 2011

(30) Foreign Application Priority Data

May 28, 2010 (JP) .................................. 2010-122754

(51) Int. Cl.
*H04B 10/67* (2013.01)
*H04B 10/69* (2013.01)

(52) U.S. Cl.
USPC .......................................... 398/209; 398/208

(58) Field of Classification Search
USPC .................................................. 398/208, 209
See application file for complete search history.

(56) References Cited

U.S. PATENT DOCUMENTS

| 5,930,045 | A | 7/1999 | Shirasaki |
| 7,324,758 | B2 * | 1/2008 | Marutani et al. ............... 398/147 |
| 7,817,925 | B2 * | 10/2010 | Honda et al. ................... 398/209 |
| 2003/0016605 | A1 * | 1/2003 | Tateyama et al. ............ 369/47.26 |
| 2004/0109637 | A1 | 6/2004 | Sugawara |
| 2007/0047964 | A1 * | 3/2007 | Ooi et al. ........................ 398/147 |
| 2008/0187323 | A1 * | 8/2008 | Honda et al. ................... 398/159 |
| 2011/0026941 | A1 | 2/2011 | Kunimatsu et al. |
| 2011/0064421 | A1 * | 3/2011 | Zhang et al. ................... 398/208 |

FOREIGN PATENT DOCUMENTS

| JP | 2000-511655 | 9/2000 |
| JP | 2003-032187 | 1/2003 |
| JP | 2004-191521 | 7/2004 |
| JP | 2007-060583 | 3/2007 |
| JP | 2007-274022 | 10/2007 |
| JP | 2011-035662 | 2/2011 |

* cited by examiner

*Primary Examiner* — Nathan Curs
(74) *Attorney, Agent, or Firm* — Foley & Lardner LLP (57) ABSTRACT

It is provided an optical receiver comprising a compensator, a compensation controller and a clock extractor. The optical receiver selects first and second values, and obtains a stabilization time necessary to change the dispersion value and a transition time shorter than the stabilization time, compensates the received optical signal using the selected first value, changes the dispersion value from the first value into the second value, compensates the received optical signal using the dispersion value when the transition time has passed since starting to change the dispersion value, creates second extraction information of the dispersion value after the transition time, compensates for dispersion of the optical signal using an dispersion value calculated based on the second value and the difference between the dispersion value after the transition time and the second value in a case where the created second extraction information indicates that the clock extraction is available.

6 Claims, 10 Drawing Sheets

CONDITIONS:
OPTICAL SIGNAL WAVELENGTH: 1552 nm
WAVEFORM: GAUSSIAN PULSE
FIBER DISPERSION/UNIT LENGTH: 17 ps/nm/km
FIBER LENGTH: 80 km
AMOUNT OF DISPERSION COMPENSATION: -1360 ps/nm

(a) WAVEFORM BEFORE TRANSMISSION

*Fig. 4A*

(b) WAVEFORM AFTER TRANSMISSION
(BEFORE COMPENSATION)

*Fig. 4B*

(c) WAVEFORM AFTER TRANSMISSION
(AFTER COMPENSATION)

| T901 | TARGET DISPERSION VALUE D2 IN CHANGING [ps/nm] | -400 | -300 | -200 | -100 | 0 | 100 | 200 | 300 | 400 |
|---|---|---|---|---|---|---|---|---|---|---|
| T902 | RESULT OF CLOCK EXTRACTION | NG | NG | NG | OK | OK | OK | OK | OK | NG |
| T903 | COMPENSATED DISPERSION VALUE (BEFORE CORRECTION) [ps/nm] | 100 (CENTER VALUE OF RANGE WHERE CLOCK EXTRACTION IS AVAILABLE) | | | | | | | | |
| T904 | ESTIMATED ATTAINED DISPERSION VALUE D WHEN CLOCK EXTRACTION IS AVAILABLE [ps/nm] | -400 | -350 | -250 | -150 | -50 | 50 | 150 | 250 | 350 |
| T905 | COMPENSATED DISPERSION VALUE (AFTER CORRECTION) [ps/nm] | 50 (CORRECTED WITH CORRECTION VALUE ΔDc = 50, WHERE D = D2 - ΔDc) | | | | | | | | |

Fig. 9

| T901 | TARGET DISPERSION VALUE D2 IN CHANGING [ps/nm] | -400 | -300 | -200 | -100 | 0 | 100 | 200 | 300 | 400 |
|---|---|---|---|---|---|---|---|---|---|---|
| T902 | RESULT OF CLOCK EXTRACTION | NG | OK | OK | OK | OK | OK | NG | NG | NG |
| T903 | COMPENSATED DISPERSION VALUE (BEFORE CORRECTION) [ps/nm] | -100 (CENTER VALUE OF RANGE WHERE CLOCK EXTRACTION IS AVAILABLE) | | | | | | | | |
| T904 | ESTIMATED ATTAINED DISPERSION VALUE D WHEN CLOCK EXTRACTION IS AVAILABLE [ps/nm] | -350 | -250 | -150 | -50 | 50 | 150 | 250 | 350 | 400 |
| T905 | COMPENSATED DISPERSION VALUE (AFTER CORRECTION) [ps/nm] | -50 (CORRECTED WITH CORRECTION VALUE ΔDc = 50, WHERE D = D2 + ΔDc) | | | | | | | | |

OPTICAL RECEIVER AND OPTICAL TRANSFER APPARATUS

CLAIM OF PRIORITY

The present application claims priority from Japanese patent application JP 2010-122754 filed on May 28, 2010, the content of which is hereby incorporated by reference into this application.

BACKGROUND OF THE INVENTION

This invention relates to an optical receiver and, in particular, relates to an optical receiver having a dispersion compensation function for compensating a waveform degraded by dispersion in an optical fiber.

Recent drastically increasing data traffic in networks represented by the Internet has imposed requirement for development of optical communication network that allows large-capacity communication. Such a large-capacity optical communication network is achieved by using wavelength division multiplexing (WDM) technology.

The WDM is a technique that multiplexes dozens of wavelengths to transmit an optical signal in a single optical fiber. Additionally, optical amplifiers or regenerators are used to achieve long distance transmission over several-hundred kilometers. Currently, wavelength division multiplexing systems for 10 Gbit/s per wavelength have come into practical use.

To design a wavelength division multiplexing system using the WDM, a dispersion compensator (DC) is necessary. The DC compensates for waveform degradation caused by chromatic dispersion in an optical fiber. For example, to compensate for chromatic dispersion in a single mode fiber (SMF) having a length of 80 km and chromatic dispersion of +20 ps/nm/km in a communication band of 1.55 μm, dispersion compensation in the amount of approximately −1600 ps/nm is required.

In specific designing a wavelength division multiplexing system, to correct an optical signal traveling through an optical fiber to have an optimum waveform, a value of dispersion compensation different from the foregoing amount of dispersion compensation may be selected considering chirping of the optical signal and nonlinear effect of the optical fiber. In an SMF, a zero dispersion wavelength, at which the wavelength dispersion becomes zero, is 1.3 micrometer (μm).

For optical fibers, there are some kinds of fibers such as dispersion-shifted fiber (DSF) in addition to the SMF. The dispersion-shifted fiber is an optical fiber in which the amount of dispersion in an optical signal wavelength is reduced by shifting the zero dispersion wavelength to 1.55 μm, which is the waveband of the optical signal.

To determine the amounts of dispersion compensation appropriate for these optical fibers, the dispersion value in an optical fiber channel to be applied is measured or estimated, and a DC having an appropriate dispersion compensation value is installed in an optical transfer apparatus. Currently, commonly-used DCs are fixed DCs such as dispersion compensating fibers (DCFs), in which the compensation value is fixed.

In using a fixed DC, however, a problem occurs that a large stock of various DCs is required depending on the guaranteed value.

Moreover, transceivers applicable to 40 Gbit/s or more have been studied recently; optical transmission at such a high transmission rate causes a spectrum width to be stretched. Consequently, there arise problems: for example, a difference (residual dispersion) between collective compensation of a WDM signal by a DCF and the optimum compensation value in each wavelength, a slight difference in compensated dispersion value such as seasonal variation in fiber dispersion characteristics caused by change in ambient temperature of the fiber, and significant effect to transmission characteristics by polarization mode dispersion (PMD).

To solve these problems, tunable dispersion compensators have been studied.

JP 2000-511655 A discloses tunable dispersion compensators that compensate for chromatic dispersion in the optical domain includes a tunable dispersion compensating apparatus using a virtual image phase array (VIPA). JP2004-191521A discloses tunable dispersion compensators that include a tunable dispersion compensator using fiber Bragg grating (FBG) or an etalon.

JP 2007-274022 A discloses a technique of electric dispersion compensator is also known as polarization mode dispersion compensator that converts an optical signal to an electric signal and corrects the waveform in the electric domain. It is known that such dispersion compensation in the electric domain is effective to chromatic dispersion.

The compensated dispersion value in the tunable dispersion compensator is changed by controlling physical mirror position or by controlling temperature of the device or adjusting parameters in the electric circuits. Such a tunable dispersion compensator typically requires time on the order of seconds to stabilize the compensated dispersion value.

The dispersion value to be compensated is different depending on the transmission path or the wavelength; accurate estimation before receipt of the signal is difficult. Hence, the compensated dispersion value should be determined while changing the dispersion value of the DC within a certain range and observing the main signal state at each dispersion value.

JP 2007-060583 A discloses a method that has been conventionally proposed is a method that controls a dispersion compensator based on the clock signal level on the receiving side to control a delayed interferometer and the DC concurrently.

As described in JP 2007-060583 A, to determine an appropriate compensated dispersion value, a method has been known that changes the dispersion value for the tunable DC within a certain range. In JP 2007-060583 A, a technique is disclosed that monitors clock signal intensity from the reproducing circuit disposed at a stage subsequent to the tunable dispersion compensator while changing the dispersion value and determines the compensated dispersion value at the center value between two dispersion values at which the clock signal intensity reaches the peak, achieving efficient setting of the dispersion value.

SUMMARY OF THE INVENTION

A tunable dispersion compensator changes dispersion value within a predetermined range to determine the dispersion value to set an appropriate compensated dispersion value automatically. On this occasion, it takes long time to obtain an appropriate waveform in a case where standing by for stabilization time, which is unique to the tunable dispersion compensator, at every dispersion value before performing operations such as clock extraction. That is to say, determining the compensated dispersion value appropriate for correcting a waveform takes long time.

A representative aspect of this invention is as follows. That is, there is provided an optical receiver comprising a compensator for compensating for dispersion of a received optical signal within a predetermined range of dispersion value; a compensation controller for instructing the compensator to compensate for dispersion of the optical signal; and a clock extractor for converting the received optical signal into an electric signal and creating extraction information indicating whether a clock can be extracted from the electric signal. The compensation controller selects a first dispersion value and a second dispersion value differing a predetermined value from each other out of the predetermined range of dispersion value. The compensation controller obtains in advance a stabilization time necessary to change the dispersion value used in the compensator from the first dispersion value to the second dispersion value, a transition time shorter than the stabilization time, and a difference between a dispersion value after the transition time and the second dispersion value. The compensator compensates the received optical signal using the selected first dispersion value in a case where the extraction information indicates that the clock extraction is unavailable. The clock extractor creates first extraction information indicating whether the clock can be extracted from the optical signal compensated using the first dispersion value. The compensation controller changes the dispersion value used in the compensator from the first dispersion value into the second distribution value as a target. The compensator compensates the received optical signal using the dispersion value when the transition time has passed since the dispersion value was started to be changed. The clock extractor creates second extraction information indicating whether the clock can be extracted from the optical signal compensated using the dispersion value after the transition time. The compensation controller causes the compensator to compensate for dispersion of the optical signal using an dispersion value calculated based on the second dispersion value and the difference between the dispersion value after the transition time and the second dispersion value in a case where the created first extraction information indicates that the clock extraction is unavailable and the created second extraction information indicates that the clock extraction is available.

An aspect of this invention achieves reduction in time to set a compensated dispersion value in a tunable dispersion compensator.

BRIEF DESCRIPTION OF THE DRAWINGS

The present invention can be appreciated by the description which follows in conjunction with the following figures, wherein.

DETAILED DESCRIPTION OF THE EMBODIMENTS

Hereinafter, embodiments of this invention will be described by way of examples with reference to the accompanying drawings.

Figure 1A:
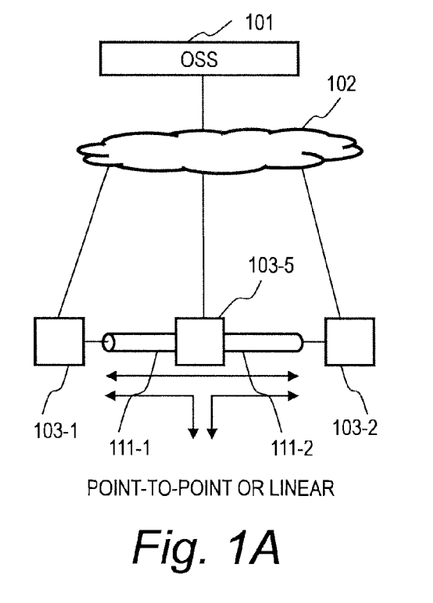
FIGS. 1A to 1C are block diagrams each illustrating an example of a network topology according to a first embodiment.
Figure 1B:
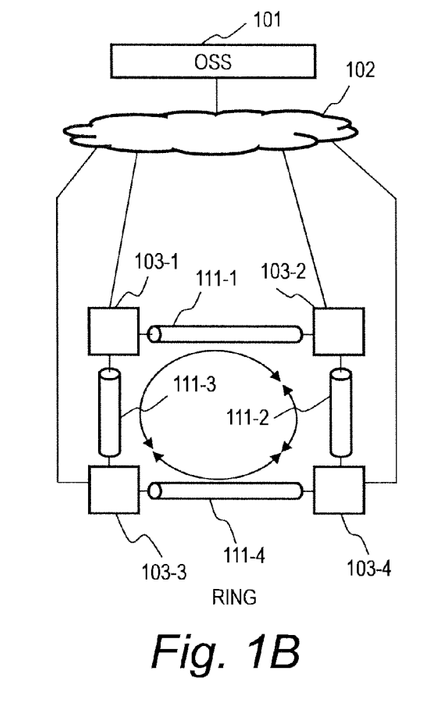
Figure 1C:
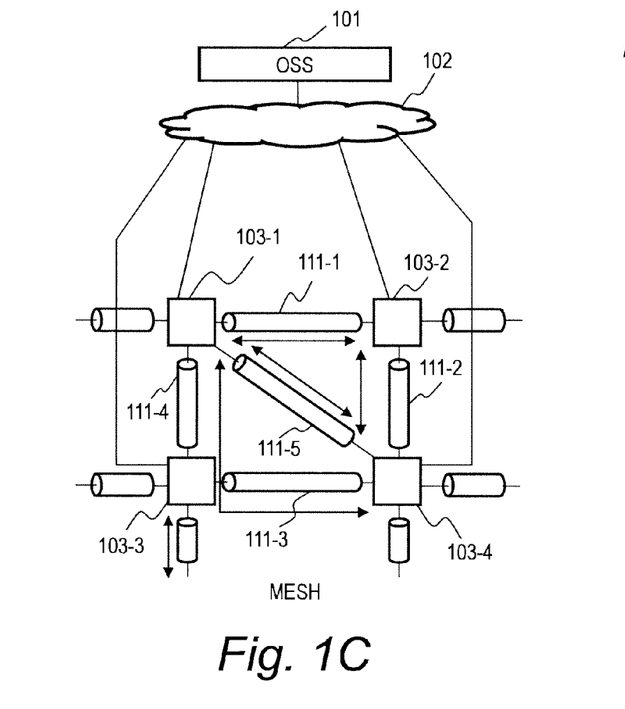

With reference to FIGS. 1A, 1B, and 1C, network topologies to which an optical transfer apparatus of a first embodiment of this invention is applied will be described.

FIG. 1A is a block diagram exemplifying a network topology according to the first embodiment.

The network shown in FIG. 1A comprises an operational support system (OSS) 101, a data communication network (DCN) 102, optical nodes 103 (103-1, 103-2, and 103-5), and transmission path fibers 111 (111-1 and 111-2).

Optical nodes 103 are optical transfer apparatuses for transferring optical signals. Transmission path fibers 111 are optical fibers for transmitting the optical signals.

The network topology in FIG. 1A is a linear network where an optical node 103-1 and an optical node 103-2 are provided at ends of the transmission path fibers 111, respectively, an optical node 103-5 is provided between the optical nodes 103-1 and 103-2, and the optical nodes 103-1 and 103-5 are connected with the transmission path fiber 111-1 and the optical nodes 103-2 and 103-5 are connected with the transmission path fiber 111-2.

In the network topology shown in FIG. 1A, the optical node 103-5 can split (drop) at least a part of the signals inserted (added) by the optical node 103-1 or 103-2. The optical node 103-5 can also add a different signal.

The solid lines with arrows in FIG. 1A indicate that paths are established between the optical nodes 103-1 and 103-2, between the optical nodes 103-1 and 103-5, and between the optical nodes 103-5 and 103-2. The optical node 103-5 does not necessarily drop a signal, but is sufficient if it has a path from the optical node 103-1 to the optical node 103-5.

The optical nodes 103-1, 103-2, and 103-5 are connected to the operational support system 101 via the data communication network 102. The functions of the operational support system 101 include configuration management, trouble management, spectrum management, and performance management of data communication network 102 including conditions of each optical node 103.

The operational support system 101 assigns two arbitrary optical nodes 103 a communication band meeting requirements. For this purpose, the operational support system 101 checks the resources available for and trouble information on the optical nodes 103 with reference to configuration management information and trouble management information, controls a plurality of optical nodes 103 including the optical nodes 103, and establishes a channel or a path.

FIG. 1B is a block diagram exemplifying another network topology according to the first embodiment.

The network shown in FIG. 1B comprises an operational support system 101, a data communication network 102, optical nodes 103 (103-1 to 103-4), and transmission path fibers 111 (111-1 to 111-4). The network topology in FIG. 1B is a ring network. In the ring network, each of the channel fibers 111-1 to 111-4 connects optical nodes 103 adjacent to one another out of the optical nodes 103-1, 103-2, 103-3, and 103-4.

In the network topology in FIG. 1B, the data communication network 102 forms a ring; accordingly, if a failure occurs at any one point of the optical fibers (transmission path fibers 111), transmission in the reversed direction can protect against the failure. The solid lines with arrows indicate that paths are established between the optical nodes 103-2 and 103-3 via the optical node 103-1, between the optical nodes 103-3 and 103-4, and between the optical nodes 103-2 and 103-4.

FIG. 1C is a block diagram exemplifying yet another network topology according to the first embodiment.

The network shown in FIG. 1C comprises an operational support system 101, a data communication network 102, optical nodes 103 (103-1 to 103-4), and transmission path fibers 111 (111-1 to 111-5). The network topology in FIG. 1C is a mesh network.

The mesh network is a network where the optical nodes 103-1, 103-2, 103-3, 103-4 and not shown other optical nodes 103 are connected with transmission path fibers 111 in a mesh-like form. The solid lines with arrows indicate that paths are established between the optical nodes 103-1 and 103-2, between the optical nodes 103-1 and 103-4 via the optical node 103-3, between the optical nodes 103-1 and 103-4, and between the optical nodes 103-2 and 103-4.

The mesh network is more difficult in operation management than the ring network, but is highly flexible in changing the route for the path in accordance with predetermined conditions.

The functions of the operational support systems 101 and the data communication networks 102 in FIGS. 1B and 1C are the same as the functions of the operational support system 101 and the data communication network 102 in FIG. 1A. In each network topology, the operational support system 101 is implemented by a central control method by one or more redundant servers.

To implement the operational support system 101, a distributed control method may be employed in which monitoring controllers mounted in the optical nodes 103 such as later-described supervisor cards (SVC) shown in FIG. 2 communicate with one another to exchange information indicating condition of the network or to calculate channels. Otherwise, the combination of the central control method and the distributed control method may be employed.

In a case where the distributed control method is employed, the functions of the operational support system 101 may be omitted or simplified. In a case where the central control method and the distributed control method are combined, the operational support system 101 and the supervisor cards may share the functions of exchanging information indicating the condition of the network, calculating channels, and controlling optical nodes 103 for establishing paths.

For a communication control technique between apparatuses to be used in the distributed control method, the Generalized Multi-Protocol Label Switching (GMPLS) protocols defined in the RFCs 3471-3473 by the Internet Engineering Task Force (IETF) may be used.

Figure 2:
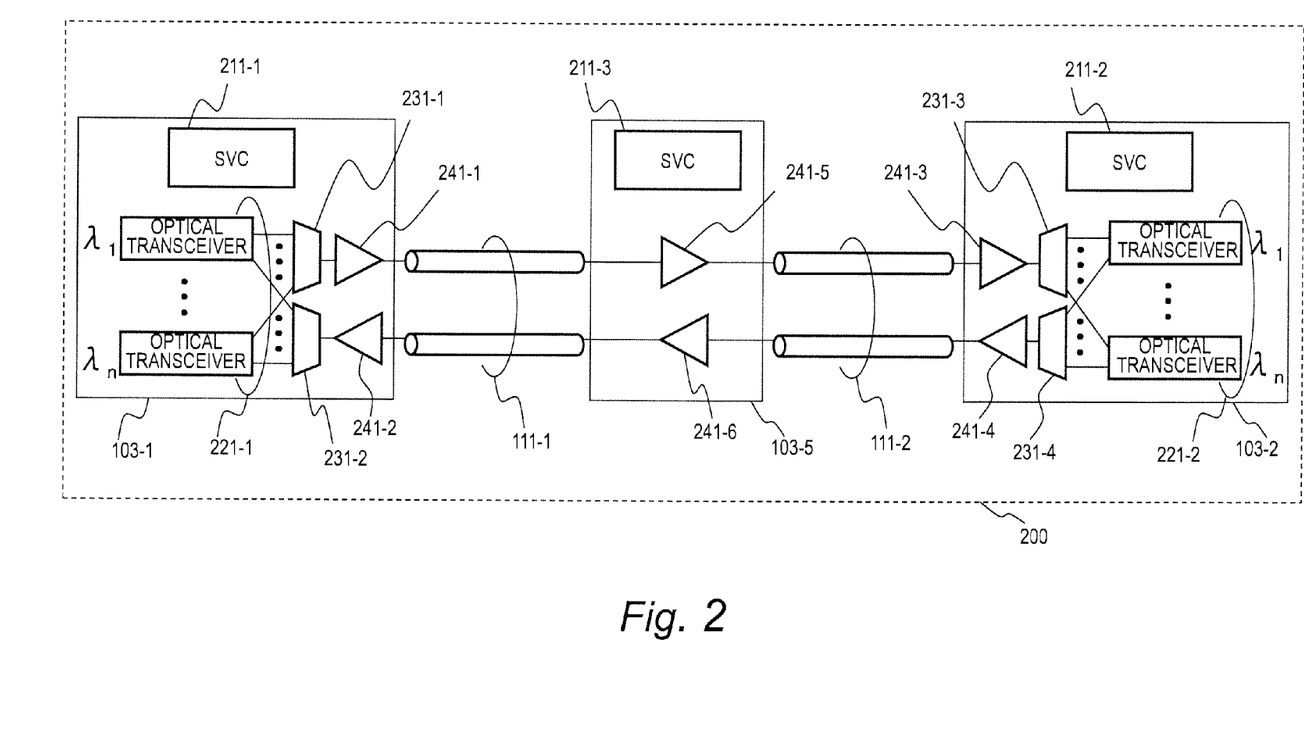
FIG. 2 is a block diagram illustrating an optical signal transfer system according to the first embodiment.

FIG. 2 is a block diagram illustrating an optical signal transfer system 200 according to the first embodiment.

The optical signal transfer system 200 comprises optical nodes 103-1 and 103-2 including optical transceivers, an optical node 103-5 that linearly repeats an optical signal, and transmission path fibers 111-1 and 111-2 connecting the optical nodes 103. The optical nodes 103-1 and 103-2 include supervisor cards (SVCS) 211-1 and 211-2, a plurality of optical transceivers 221 (221-1 and 221-2), multiplexers/demultiplexers 231 (231-1, 231-2 and 231-3, 231-4), and optical amplifiers 241 (241-1, 241-2 and 241-3, 241-4), respectively.

The optical transceivers 221 are provided based on the number of wavelengths to be used. A wavelength multiplexer/demultiplexer 231 in a transmitting optical node 103 multiplexes optical signals having wavelengths assigned ($\lambda 1, \lambda 2, \ldots \lambda n$) in the wavelength domain to convert them into a wavelength-multiplexed signal. A wavelength multiplexer/demultiplexer 231 in a receiving optical node 103 conversely demultiplexes the wavelength-multiplexed signal into signals having original different wavelengths. The optical amplifier 241 amplifies a wavelength-multiplexed signal in the optical domain.

An optical transceiver 221 is connected to a client apparatus with an optical signal or connected to a different apparatus such as an electric switch (not shown) in the optical node 103 with an electric signal. A light source used for the optical transceiver 221 may be a light source that emits light having a fixed wavelength or a variable wavelength light source that can change transmission wavelength by remote control. The configuration of the optical transceiver 221 will be described in detail later with reference to FIG. 5.

The wavelength is selected so as to match the wavelength grids defined by the ITU-T recommendations G694.1 and G694.2. The number of wavelengths may be selected variously, for example, 8, 16, 20, 40, 64, 80, 128, or 160, by devising transmission conditions.

For the wavelength multiplexers/demultiplexers 231-1 to 231-4, planar lightwave circuit (PLC) elements called arrayed waveguide gratings (AWG) may be used.

An optical node 103-5 includes a supervisor card (SVC) 211-3, and optical amplifiers 241-5 and 241-6. The optical node 103-5 functions as a linear repeater to extend the transmission distance. Hence, the optical node 103-5 amplifies a wavelength-multiplexed signal with the optical amplifiers 241-5 and 241-6 to compensate for signal loss by the transmission path fibers 111-1 and 111-2.

For the optical amplifiers 241-5 and 241-6, optical amplifiers 241 having appropriate functions and capabilities are selected to keep a predetermined quality standard of a main signal depending on the transmission distance and the type of optical fiber. For the quality standard of the main signal, a bit error rate may be specified: for example, the bit error rate may be set at $10^{-12}$ or less to the optical amplifier 241.

In the optical signal transfer system 200, a plurality of optical nodes 103-5 may be provided to further extend the transmission distance between the optical nodes 103-1 and 103-2. For optical amplifiers 241-5 and 241-6, erbium-doped fiber amplifiers (EDFAs) or Raman amplifiers may be used.

In the optical node 103-5, the supervisor card 211-3 monitors optical power, wavelength, optical signal-to-noise ratio, and the like. Although omitted from FIG. 2 for simplification, an optical supervisory channel (OSC) using a wavelength dedicated to monitoring control may be employed in addition to the main signal to transfer information for monitoring control among the optical nodes.

The optical signal transfer system 200 shown in FIG. 2 corresponds to the linear network shown in FIG. 1A, but the optical node 103-5 in FIG. 2 merely repeats an optical signal and cannot drop or add an optical signal.

Figure 3:
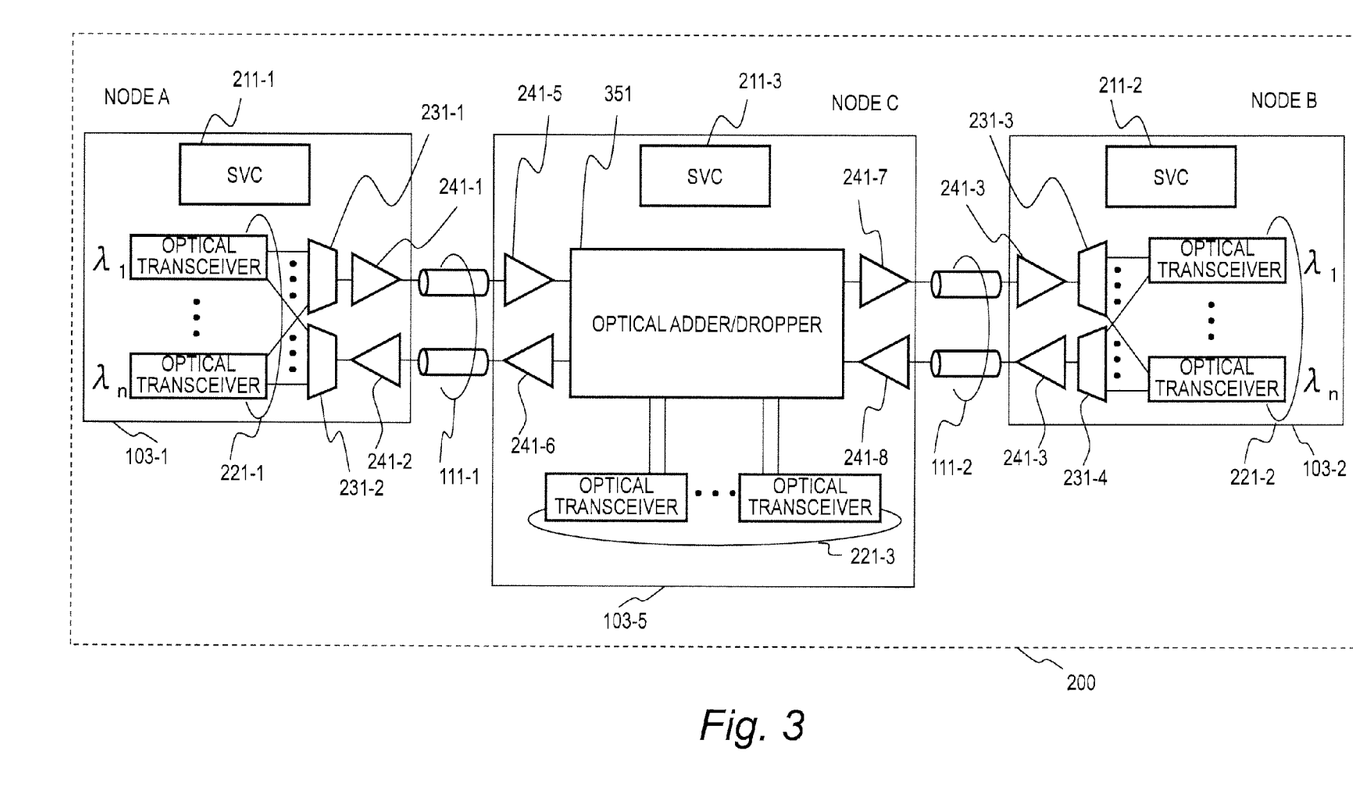
FIG. 3 is a block diagram illustrating a modified example of an optical signal transfer system according to the first embodiment.

FIG. 3 is a block diagram illustrating a modified example of the optical signal transfer system 200 according to the first embodiment.

In the optical signal transfer system 200 shown in FIG. 3, an optical transmitter is provided between optical nodes 103-1 and 103-2. The optical transfer apparatus in this embodiment is provided in the optical node 103-5. The optical transmission apparatus is an apparatus having a function of dropping and adding an optical signal of an intended wavelength among a plurality of wavelength-multiplexed optical signals using an optical modulation/demodulation filter and an optical switch.

In particular, an optical transfer apparatus that drops and adds an optical signal without converting the optical signal to an electric signal is called optical add-drop multiplexer (OADM). An OADM is frequently used in a linear topology shown in FIG. 1A or a ring topology shown in FIG. 1B. The optical signal transfer system 200 in FIG. 3 implements an optical adder/dropper 351 including the function of the OADM in the optical node 103-5.

For apparatuses that drop and add a signal in the optical domain using the OADM, PLC optical switches, mechanical optical switches, micro-electro-mechanical system (MEMS) optical switches, liquid crystal optical switches, and wavelength selective switches (WSS) with multiplexing/demultiplexing function integrated are commercially available.

An OADM using a WSS can be used in a mesh topology shown in FIG. 1C. An optical signal channel selection apparatus used in the mesh topology is sometimes called optical cross connect (OXC).

The optical node 103-5 in FIG. 3 includes optical amplifiers 241-5 to 241-8, an optical adder/dropper 351, optical transceivers 221-3 in the number of wavelengths to be used, and a supervisor card 211-3. The optical amplifiers 241-5 to 241-8 have the same functions as the optical amplifier 241 in FIG. 2; the optical transceivers 221-3 have the same functions as the optical transceiver 221 in FIG. 2; and the supervisor card 221-3 has the same functions as the supervisor card 211.

The optical signal transfer system 200 in FIG. 3 corresponds to the linear network in FIG. 1A and the optical node 103-5 in FIG. 3 can add and drop an optical signal.

The optical transceiver 221-3 may have a regenerating function as necessary. Namely, the optical transceiver 221-3 may convert an optical signal propagated through the transmission path fiber 111 into an electric signal, shape the waveform of the electric signal, digitally monitor the quality of the electric signal, convert the electric signal into an optical signal again, and then transmit it to the transmission path fiber 111. To manage the quality of a signal, code error monitoring by a method called bit interleaved parity (BIP) may be specifically used.

Whether to provide the optical node 103-5 having the above-described regenerative repeating function, whether to provide the optical node 103-5 having the linear repeating function, or how many such optical nodes 103 should be provided between the optical nodes 103-1 and 103-2 is determined depending on whether an intended quality of the main signal can be attained or not in designing dropping.

The optical nodes 103-1 and 103-2 in FIG. 3 are the same as the optical nodes 103-1 and 103-2 in FIG. 2, respectively; the transmission path fibers 111-1 and 111-2 in FIG. 3 are the same as the transmission path fibers 111-1 and 111-2 in FIG. 2, respectively.

Figure 4A:
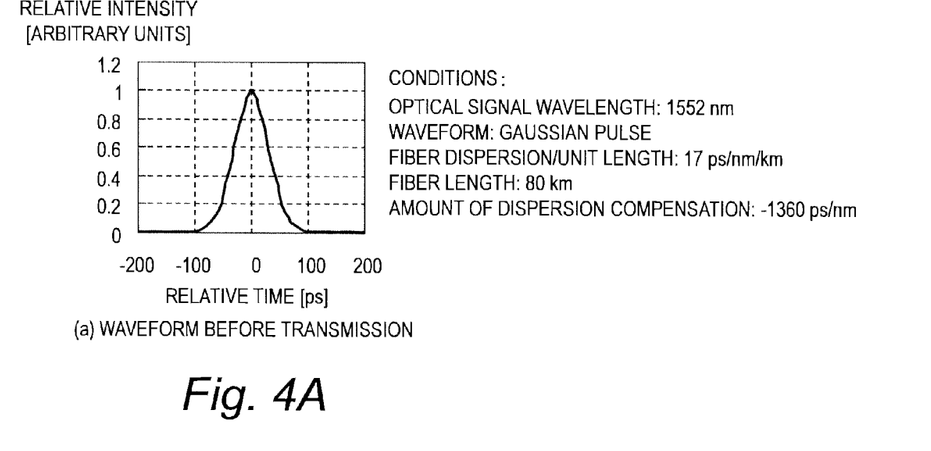
FIG. 4A is an explanatory diagram illustrating a waveform before an optical signal is chromatically dispersed according to the first embodiment of this invention.
Figure 4B:
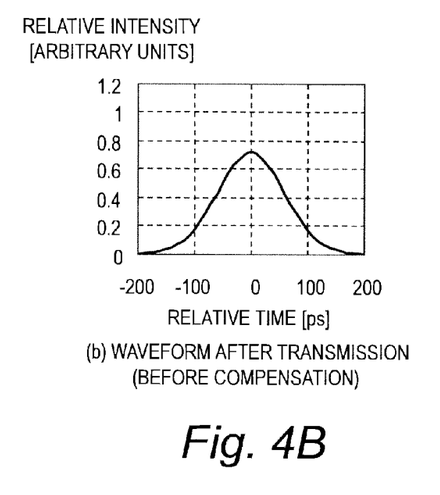
FIG. 4B is an explanatory diagram illustrating a waveform after a signal is chromatically dispersed according to in the first embodiment of this invention.
Figure 4C:
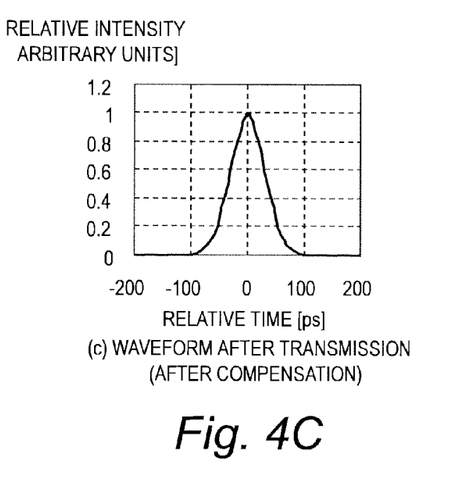
FIG. 4C is an explanatory diagram schematically illustrating an effect of a dispersion compensator according to the first embodiment of this invention.

With reference to FIGS. 4A to 4C, waveform degradation caused by chromatic dispersion in a transmission path fiber 111 and the effect of dispersion compensation to the waveform degradation will be described. In this calculation, a single mode fiber (SMF) was used.

FIG. 4A is an explanatory diagram illustrating a waveform before an optical signal is chromatically dispersed according to the first embodiment of this invention.

FIG. 4A shows a waveform indicating one-bit pulse of the optical signal that passes through the transmission path fiber 111 with respect to the time axis. In FIG. 4A, the waveform shows a Gauss distribution and the peak intensity thereof is defined as 1. The half width at half maximum (HWHM) of this waveform is approximately 40 ps.

The waveforms shown in FIG. 4A to FIG. 4C are waveforms of an optical signal under conditions of an optical signal wavelength of 1552 nm, a waveform with a Gaussian pulse, the fiber dispersion/unit length of 17 ps/nm/km, a fiber length of 80 km, and an amount of dispersion compensation of −1360 ps/nm.

FIG. 4B is an explanatory diagram illustrating a waveform after the signal is chromatically dispersed according to in the first embodiment of this invention.

FIG. 4B shows a waveform of an optical signal after transmitted through an SMF with chromatic dispersion of 17 ps/nm/km along 80 km. Since the chromatic dispersion causes the group velocity to differ in every wavelength component included in the pulse of the optical signal, the intensity is lowered to 0.72 and the HWHM is stretched to approximately 80 ps.

If the intensity of the optical signal is lowered and the HWHM is stretched, the waveform included in the optical signal might not be able to be obtained normally (namely, a clock is likely to be unable to be extracted). Accordingly, in an optical signal transfer system, it is necessary to compensate for waveform degradation caused by dispersion to keep a predetermined quality. For this reason, the optical transfer system shown in FIG. 2 or FIG. 3 is provided with a dispersion compensator.

FIG. 4C is an explanatory diagram schematically illustrating the effect of the dispersion compensator according to the first embodiment of this invention.

FIG. 4C shows a waveform to which dispersion compensation of −1360 ps/nm (=−17×80 ps/nm) has been applied to the waveform shown in FIG. 4B.

The waveform after dispersion compensation in FIG. 4C is almost the same as the waveform before dispersion in FIG. 4A, so that the waveform can be obtained normally. In other words, a clock can be extracted from the waveform after dispersion compensation in a case where the dispersion compensation is appropriate.

Dispersion compensators are distributed at the optical nodes 103 of a transmission node, a receiving node, and a repeater node for appropriate compensation amount in accordance with a transmission design. A dispersion compensator may be disposed close to an optical amplifier 241 or the optical multiplexer/demultiplexer 231 to compensate a wavelength-multiplexed signal collectively or may be disposed close to an optical transceiver 221 to compensate in individual wavelengths.

Figure 5:
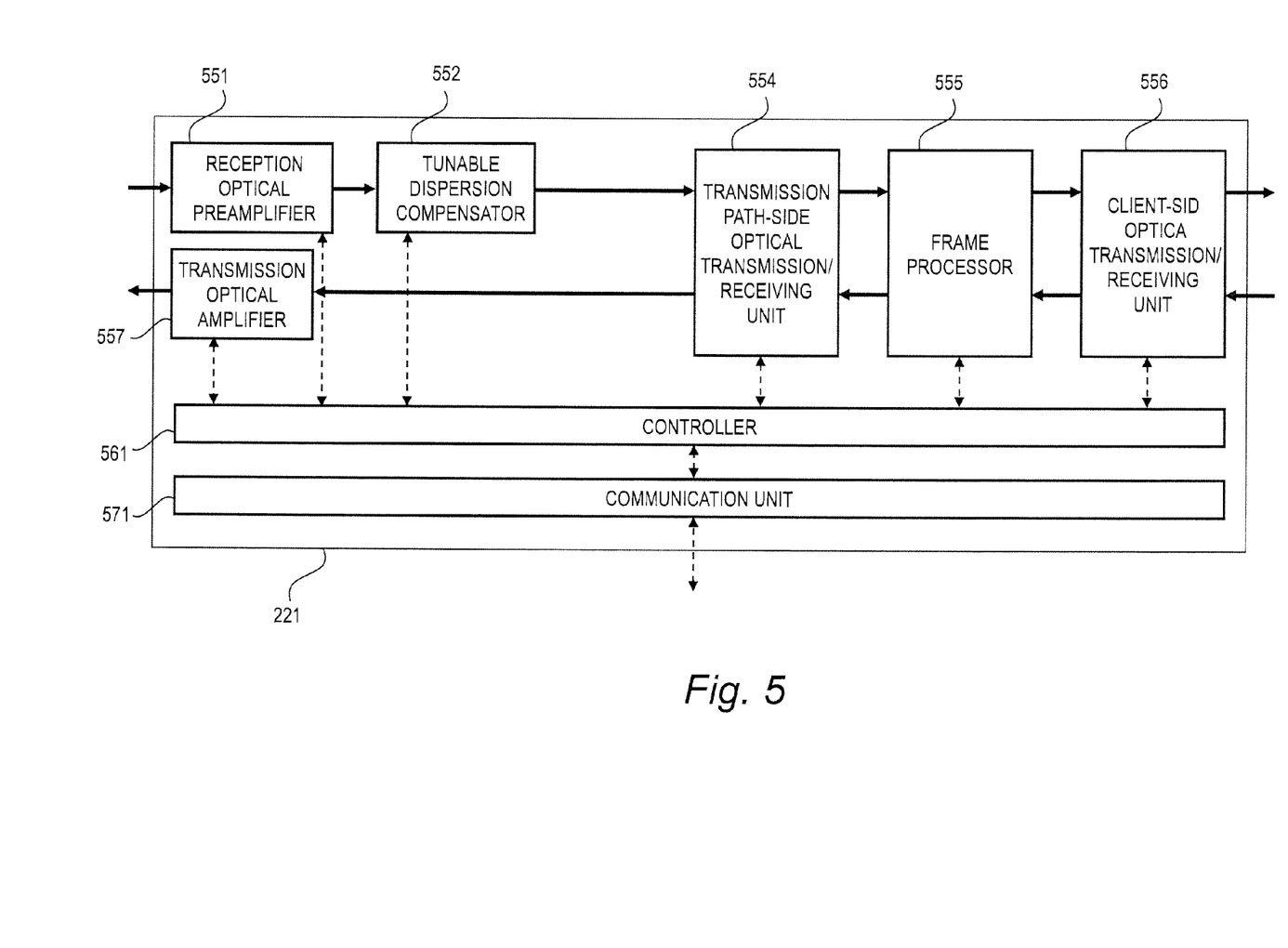
FIG. 5 is a block diagram illustrating a physical configuration of an optical transceiver according to the first embodiment of this invention.

FIG. 5 is a block diagram illustrating a physical configuration of an optical transceiver 221 in the first embodiment.

The optical transceiver 221 comprises a reception optical preamplifier 551, a tunable dispersion compensator 552, a transmission optical amplifier 557, a transmission path-side optical transmission/receiving unit 554, a frame processor 555, a client-side optical transmission/receiving unit 556, a controller 561, and a communication unit 571.

A client-side optical signal transmitted by the client-side transmission/receiving unit 556 may be, for example, an STM-16 (2.5 Gbit/s), an STM-64 (10 Gbit/s), or an STM-256 (40 Gbit/s). Alternatively, the client-side optical signal may be a GbE (1 Gbit/s) defined by the IEEE 802.3z, a 10 GbE (10.3 Gbit/s) defined by the IEEE 802.3ae, or a 40 GbE/100 GbE discussed by the IEEE 802.3ba.

The frame processor 555 adds an overhead and an error-correcting code to an client signal transmitted from the client-side optical transmission/receiving unit 556 by mapping the signal to the OTU1 (2.7 Gbit/s), OTU2 (10.7 Gbit/s) or OTU3 (42.8 Gbit/S) defined by the OTN in the ITU-T G.709 or terminates them in the signal received at the client-side optical transmission/receiving unit 556. In a case where a function for processing signals in accordance with the modulation scheme of optical signal is necessary, the signal processing function may be implemented in the frame processor 555 or the transmission path-side optical transmission/receiving unit 554. The frame processor 555 may be implemented by an LSI, a plurality of LSIs, or an FPGA.

The transmission path-side optical transmission/receiving unit 554 includes built-in continuous light having a wavelength defined by the ITU-T; in accordance with a signal from the frame processor 555, it modulates the light by a modulation scheme suitable for transmission, and outputs the modulated optical signal. The modulation scheme in the transmission path-side optical transmission/receiving unit 554 may be the non return-to-zero (NRZ), the optical duo-binary (ODB), the differential phase shift keying (DPSK), or the differential quadrature phase shift keying (DQPSK).

The DQPSK includes modulation schemes of RZ-DSPK, NRZ-DPSK, RZ-DQPSK, NRZ-DQPSK, and carrier-suppressed return-to-zero (CSRZ)-DQPSK.

The transmission path-side optical transmission/receiving unit 554 converts an optical signal received from the tunable dispersion compensator 552 into an electric signal and further modifies the signal speed for the frame processor 555 to be able to process. The reception optical preamplifier 551 compensates for the loss at the tunable dispersion compensator 552 since the level of the optical signal received by the transmission path-side optical transmission/receiving unit 554 dynamically changes. Accordingly, the reception optical preamplifier 551 may be provided between the tunable dispersion compensator 552 and the transmission path-side optical transmission/receiving unit 554; alternatively, two reception optical preamplifiers 551 may be provided at both anterior and posterior of the tunable dispersion compensator 552.

The transmission optical amplifier 557 adjusts the intensity of the optical signal from the transmission path-side optical transmission/receiving unit 554 to be suitable for transmission to the transmission path fiber 111 via the wavelength multiplexer/demultiplexer 231 and the optical amplifier 241 for multiplexed-wavelength signal. The optical power (intensity) to be transmitted to the transmission path fiber 111 is determined in consideration of the number of wavelengths, the loss in the transmission paths between optical nodes, optical signal to noise ratio (OSNR) by the noise figure of the optical amplifier 241, nonlinear effect, chromatic dispersion, waveform degradation caused by polarized dispersion in the optical fiber, and increase in noise.

As the nonlinear effect, self phase modulation (SPM), cross phase modulation (XPM), and four-wave-mixing are known. The amount of waveform degradation depends on the number of wavelengths, the fiber dispersion, the nonlinear coefficient, the input power to the fiber, the optical fiber loss, etc. The fiber dispersion and the nonlinear coefficient are different depending on the type of the transmission path fiber 111, for example, a single mode fiber (SMF) or a dispersion-shift fiber (DSF).

The tunable dispersion compensator 552 applies dispersion having the opposite characteristic of the fiber dispersion to the optical signal having a waveform degraded by the fiber dispersion to reform the waveform of the optical signal.

The controller 561 obtains various information from the reception optical preamplifier 551, the tunable dispersion compensator 552, the transmission optical amplifier 557, the transmission path-side optical transmission/receiving unit 554, the frame processor 555, and the client-side optical transmission/receiving unit 556 to control the components using the information.

The communication unit 571 communicates with the supervisor card 211 shown in FIG. 3 to send information on the optical transceiver 221 to the operational support system and delivers control information from the operational support system to the controller 561.

Figure 6:
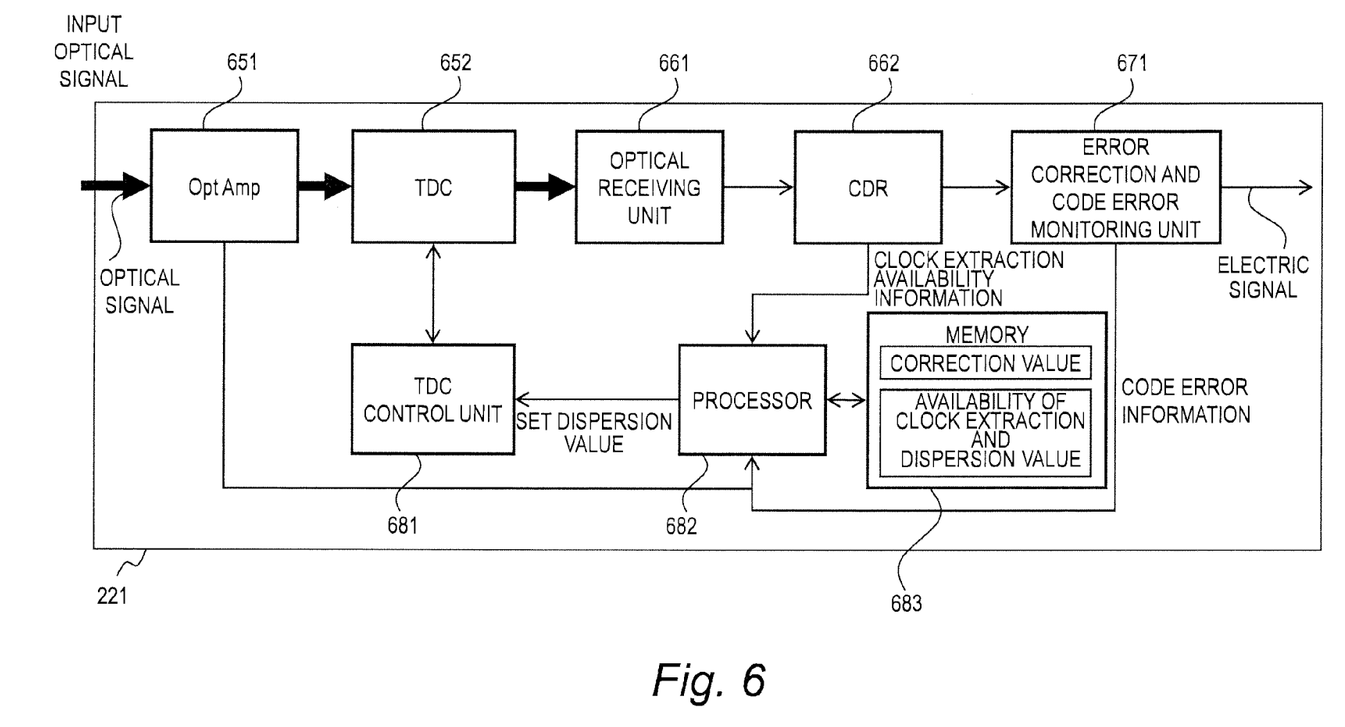
FIG. 6 is a block diagram illustrating a logical configuration of the optical transceiver according to the first embodiment of this invention.

FIG. 6 is a block diagram illustrating a logical configuration of the optical transceiver 221 according to the first embodiment of this invention.

With reference to FIG. 6, a more detailed configuration of the optical transceiver 221 used in an optical node 103 will be described. FIG. 6 shows only the parts necessary to explain this embodiment in the configurations of the optical node 103 in FIG. 2 and FIG. 3 and the optical transceiver 221 in FIG. 5.

The optical transceiver 221 includes an optical amplifying unit (OptAmp) 651, a tunable dispersion compensating unit (TDC) 652, an optical receiving unit 661, a clock data recovery unit (CDR) 662, an error correction and code error monitoring unit 671, a processor 682, a memory 683, and a TDC control unit 681.

The optical amplifying unit 651 is included in the reception optical preamplifier 551 and the TDC (tunable dispersion compensating unit) 652 is included in the tunable dispersion compensator 552. The optical receiving unit 661 and the clock data recovery unit 662 are included in the transmission path-side optical transmission/receiving unit 554 and the error correction and code error monitoring unit 671 is included in the frame processor 555 in FIG. 5. The processor 682, the memory 683, and the TDC control unit 681 are included in the controller 561 in FIG. 5.

The optical transceiver 221 in FIG. 6 illustrates the route of an optical signal inputted from the reception optical preamplifier 551 with constituents that process the optical signal. In FIG. 6, the constituents corresponding to the client-side optical transmission/receiving unit 556 and the transmission optical amplifier 557 are omitted.

Hereinafter, operations of the optical transceiver 221 will be described. The inputted optical signal is amplified by the optical amplifying unit 651 to a predetermined optical power. The optical amplifying unit 651 also monitors input of optical signals. The tunable dispersion compensating unit 652 reshapes the waveform by adding dispersion opposite from the dispersion applied by the transmission path fiber 111 to the optical signal.

The optical receiving unit 661 converts the inputted optical signal from light to electricity and monitors the optical power of the inputted optical signal. The clock data recovery unit 662 extracts a clock from the converted electric signal and regenerates it with a predetermined threshold value using the extracted clock.

The error correction and code error monitoring unit 671 monitors error correction information and BIP information included in overheads for a code error. The memory 683 stores initial setting information for the TDC 652, association information of dispersion values with error rates, dispersion correction values, and compensated dispersion values, which will be described later.

The processor 682 retrieves information on availability for extracting a clock from the clock data recovery unit 662, information on optical input from the optical amplifying unit 651, and information in the memory 683 and sends control information to the TDC control unit 681, and further inputs later-described information on dispersion values and error rates to the memory 683.

Upon receipt of control information from the processor 682, the TDC control unit 681 controls the tunable dispersion compensating unit 652 in accordance with the received control information. The TDC control unit 681 controls the tunable dispersion compensating unit 652 by making the tunable dispersion compensating unit 652 change the dispersion value in the tunable dispersion compensating unit 652.

In this embodiment, the tunable dispersion compensating unit 652 and the tunable dispersion compensator 552 are the same function; accordingly, processes in the tunable dispersion compensating unit 652 will be explained in the following description.

Figure 7:
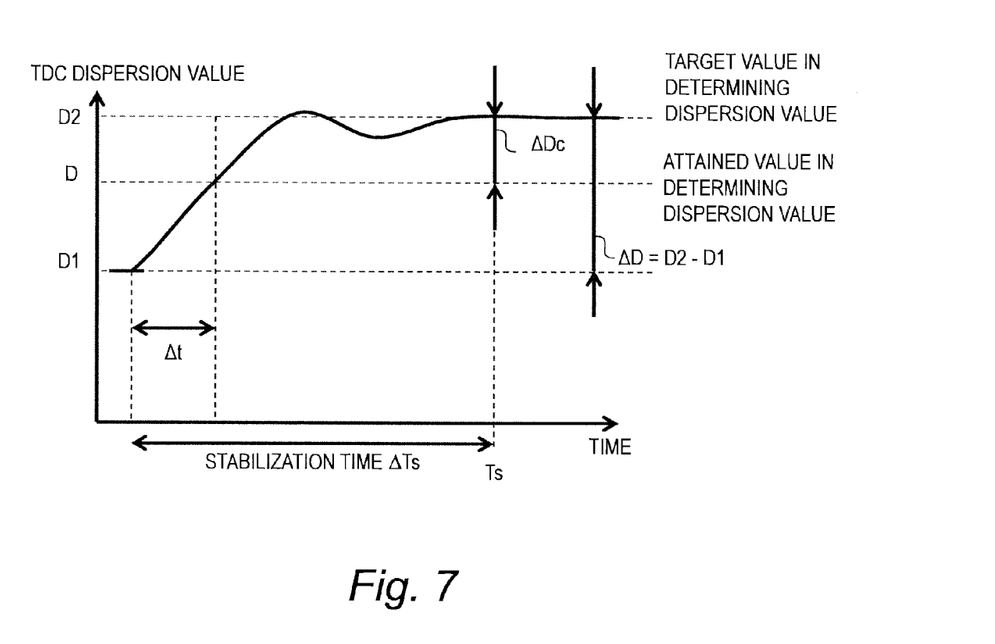
FIG. 7 is a drawing illustrating a time response characteristic of a tunable dispersion compensating unit according to the first embodiment of this invention.

FIG. 7 is a drawing illustrating the time response characteristic of the tunable dispersion compensating unit 625 according to the first embodiment of this invention.

The tunable dispersion compensating unit 652 needs time to stabilize the compensated dispersion value, like the tunable dispersion compensators disclosed in the previously discussed JP2004-191521 and JP2007-274022. In other words, the tunable dispersion compensating unit 652 needs a certain response time to change the dispersion of a received optical signal from a dispersion value D1 into a dispersion value D2, which differs from the value D1 by ΔD.

The tunable dispersion compensating unit 652 in FIG. 7 needs a stabilization time ΔTs to change the dispersion value D1 of the received optical signal into the target dispersion value D2. At a transition time Δt from the start of changing the dispersion value to the stabilized time Ts, the dispersion value D of the received optical signal is the value (D2−ΔDc) and the difference between the dispersion value D at Δt and the target value of dispersion value D2 is ΔDc.

The ΔDc in this embodiment is a range of dispersion value in which nearly the same waveform can be attained as the waveform of the optical signal obtained at the target dispersion value D2. In other words, in a case where an optical signal is converted into an electric signal and the clock of the converted electric signal is extracted in a range of dispersion value of D2-ΔDc, almost the same clock extraction availability can be expected as that at the target dispersion value D2.

The Δt in this embodiment indicates the time period from the time when the dispersion value is changed to the time when the dispersion value reaches D2−ΔDc. The stabilization time ΔTs, the ΔDc, and the Δt for ΔD of the variation in the dispersion value are fixed depending on the type of the tunable dispersion compensating unit 652 and are preliminarily measured in this embodiment.

Next, with reference to FIG. 6, FIG. 8, and FIG. 9, operations of the optical transceiver 221 when a path is opened will be described in the case where the tunable dispersion compensating unit 652 receives an optical signal for the first time or after a while it has not received an optical signal.

Figure 8:
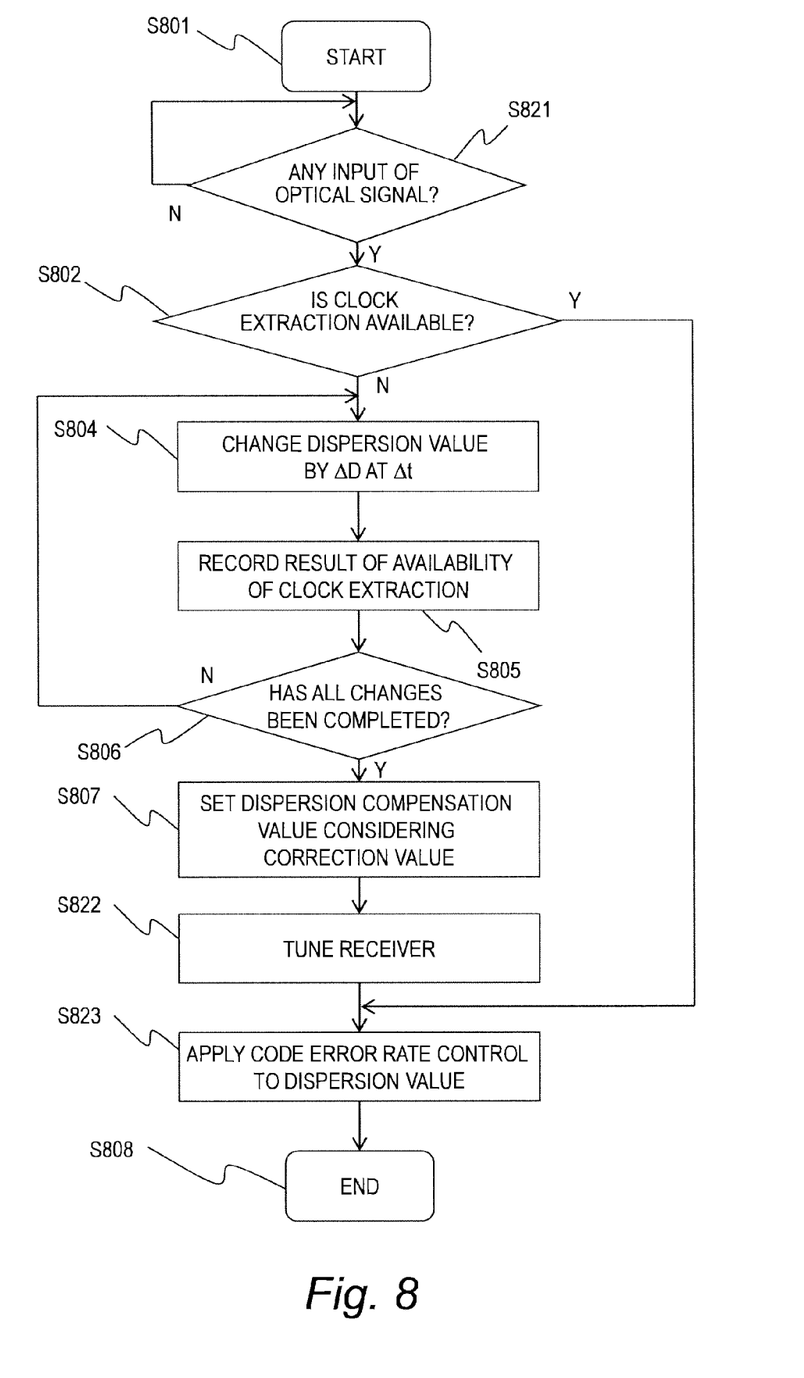
FIG. 8 is a flowchart illustrating a process executed in the optical transceiver according to the first embodiment of this invention.

FIG. 8 is a flowchart illustrating a process executed in the optical transceiver 221 according to the first embodiment of this invention.

As illustrated in FIG. 1, the operational support system 101 makes settings to the optical transceiver 221 via the supervisor card 211 to open a path by means of a command or signaling by the GMPLS, and the optical transceiver 221 starts the process (S801). The optical amplifying unit 651 determines whether an optical signal is inputted or not (S821) and, in a case where it determines that no optical signal is inputted, it waits for an input of an optical signal.

In a case where the optical amplifying unit 651 determines that an optical signal is inputted at S821, it amplifies the optical signal to a predetermined intensity. The optical signal travels through the tunable dispersion compensating unit 652 and is converted into an electric signal by the optical receiving unit 661.

The electric signal processed by the optical receiving unit 661 enters the clock data recovery unit 662, where the availability of clock extraction is determined (S802). The clock data recovery unit 662 sends the result at S802 to the processor 682.

In a case where the clock data recovery unit 662 determines that clock extraction is available at S802, the tunable dispersion compensating unit 652 does not need to change the compensated dispersion value; accordingly, the process in the optical transceiver 221 proceeds to S823.

In a case where the clock data recovery unit 662 determines that clock extraction is unavailable at S802, the processor 682 instructs, after receipt of information indicating the unavailability of clock extraction, the tunable dispersion compensating unit 652 via the TDC control unit 681 to change the dispersion value within the later-described predetermined range in order to determine an appropriate compensated dispersion value for the tunable dispersion compensating unit 652 (S804). The processor 682 records the changed dispersion value and the information on availability of clock extraction in the memory 683 (S805), and repeats these steps at every dispersion value in the predetermined range (S806).

The processor 682 changes the dispersion value in the tunable dispersion compensating unit 652 by ΔD at time intervals of Δt described with reference to FIG. 7. As previously described, the ΔD and the Δt are preliminarily measured. The clock data recovery unit 662 obtains the result of clock extraction after the time Δt has elapsed since the tunable dispersion compensating unit 652 changed the dispersion value.

Figure 9:
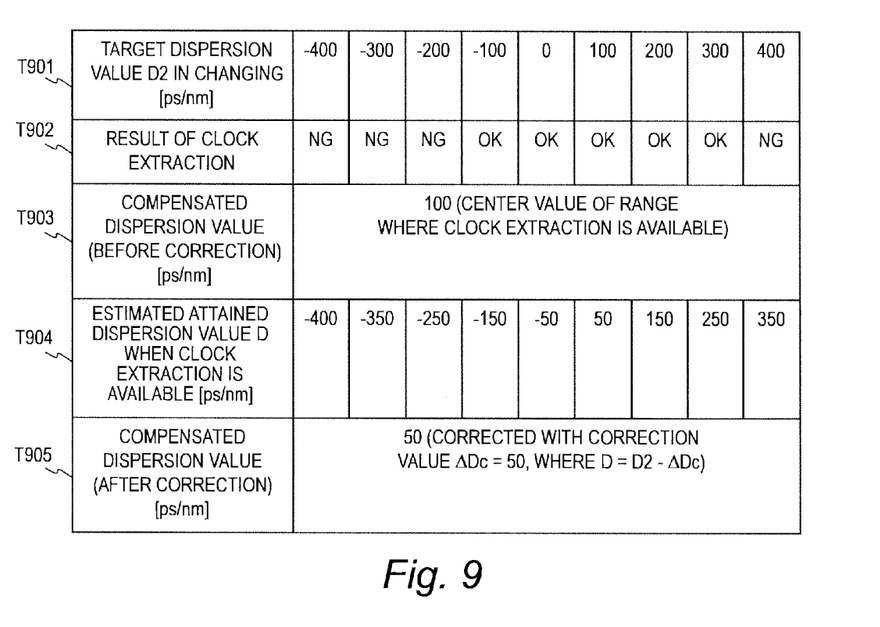
FIG. 9 is an explanatory diagram illustrating correction of dispersion value according to the first embodiment of this invention.

FIG. 9 is an explanatory diagram illustrating correction of dispersion value according to the first embodiment of this invention.

The range of change for the dispersion value is predetermined depending on the kind of the tunable dispersion compensating unit 652. The tunable dispersion compensating unit 652 in this embodiment can change the dispersion value in the range from −400 [ps/nm] to 400 [ps/nm].

Target dispersion values T901 indicate target values of dispersion changed by the processor 682 at every Δt S804 in FIG. 8. Results of clock extraction T902 indicate the results of the determination at S805. For example, the processor 682 changes the dispersion value to be targeted at −200 [ps/nm] indicated by the dispersion target value T901 and, after the time Δt has elapsed since the start of the change, the clock data recovery unit 662 obtains a result of clock extraction T902 indicating NG and the processor 682 changes the dispersion value to be targeted at −100 [ps/nm]. After another time of Δt has elapsed since the dispersion value was changed for −100

[ps/nm], the clock data recovery unit 662 obtains a result of clock extraction indicating OK.

The results of clock extraction T902 in FIG. 9 indicate the results of clock extraction in the case where the processor 682 sequentially selects the target dispersion values T901 from the lowest value to the highest value.

After inputting the result to the memory 683 at S805, the processor 682 repeats to change the target dispersion value up to 400 [ps/nm] at time intervals of $\Delta t$ to determine the results of clock extraction (S806). It should be noted that the $\Delta D$ in this embodiment is 100 [ps/nm].

Through the processes at S804 to S806 in FIG. 8, the target dispersion values T901 and the results of clock extraction T902 are created.

The results of clock extraction that the processor 682 receives from the clock data recovery unit 662 do not need to be clock intensities but results indicating whether a clock can be extracted or not at a certain frequency. This configuration achieves simplification of circuits.

Through the processes up to S806 in FIG. 8, dispersion values at which clock extraction is available and unavailable are found. Accordingly, the processor 682 determines a compensated dispersion value before correction (T903 in FIG. 9) from the range in which clock extraction is found to be available (S807). For example, the processor 682 determines the compensated dispersion value before correction at the center value of the range of dispersion values determined to be available for clock extraction (100 [ps/nm] in this embodiment).

At S805 in this embodiment, the time interval to change the dispersion value by $\Delta D$ should not be the aforementioned stabilization time $\Delta Ts$ but $\Delta t$. The time $\Delta t$ is shorter than $\Delta Ts$ as indicated in FIG. 7.

This is because, in the case of the dispersion value after $\Delta t$ has passed since start of changing the dispersion value, the waveform of an optical signal is almost the same as the one at the target dispersion value, so that the availability of clock extraction can be determined. The stand-by period $\Delta t$ allows the dispersion value to be changed in a shorter time than standing-by for an stabilization time $\Delta Ts$, achieving the determination of a compensated dispersion value in a short time.

The processor 682 further stores the values obtained by subtracting $\Delta Dc$ from the values T901 in attained dispersion values T904 since the tunable dispersion compensating unit 652 actually obtains a dispersion value after the time $\Delta t$ has passed since it started changing the dispersion value. The processor 682 obtains the center value of the values of T904 in the range where clock extraction is available and stores it to the corrected compensated dispersion value T905.

To know the characteristics (such as $\Delta Dc$ and $\Delta t$) of the tunable dispersion compensating unit 652 in FIG. 7 in advance enables estimation of the attained dispersion value at the time $\Delta t$. Accordingly, the optical transceiver 221 sets a corrected compensated dispersion value to the tunable dispersion compensator 652 in consideration of $\Delta Dc$ (S807).

It should be noted that the $\Delta Dc$ and $\Delta t$ are interdependent values and are set based on the characteristics of the tunable dispersion compensating unit 652. The time $\Delta t$ allows a result of clock extraction at each dispersion value to be obtained without waiting for the stabilization time $\Delta Ts$, so that the tunable dispersion compensating unit 652 can change the dispersion value at a more earlier occasion.

After S807, the optical transceiver 221 is tuned in accordance with the transmission and receiving scheme in the optical transceiver 221 (S822).

In a case where a clock can be extracted at the set compensated dispersion value and data can be reproduced after S822 or S802, in order to further optimize the compensated dispersion value, the processor 682 may fine adjust the compensated dispersion value in the tunable dispersion compensating unit 652 in accordance with the error correction information or code error information so that the number of corrections or errors will be minimized or less than a threshold value (S823).

After S823, the optical transceiver 221 terminates the process to open a new path (S808).

In this example, the processor 682 sequentially changes the dispersion value from a low value to a higher value at the S804 in FIG. 8 to obtain results of clock extraction, but it may sequentially change the dispersion value from a high value to a lower value.

Figure 10:
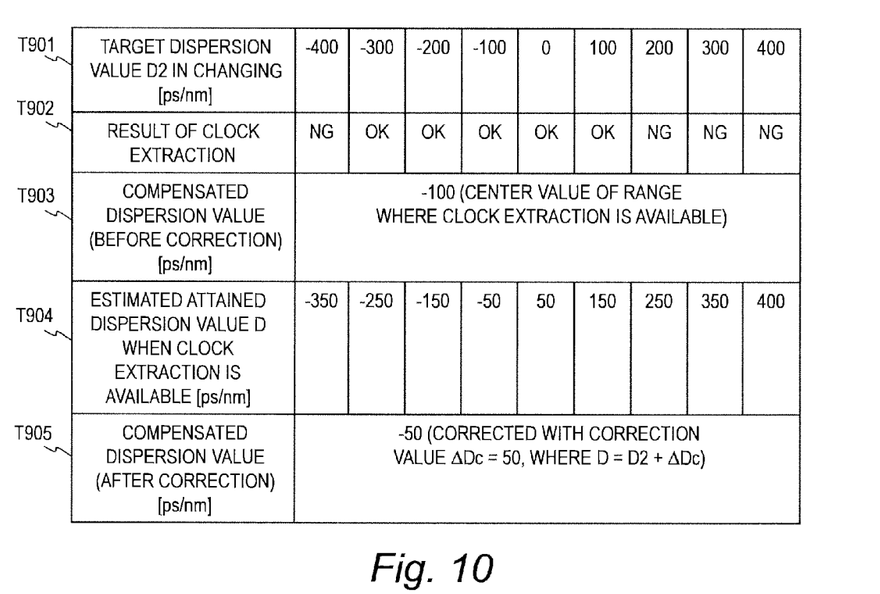
FIG. 10 is an explanatory diagram illustrating another example of correcting a dispersion value according to the first embodiment of this invention.

FIG. 10 is an explanatory diagram illustrating another example of correcting the dispersion value according to the first embodiment of this invention.

The reference sign T902 in FIG. 10 indicates the results of clock extraction in the case where the dispersion value is changed from a high value to a lower value at S805. The compensated dispersion value before correction T903 in FIG. 10 is −100 [ps/nm].

The processor 682 adds $\Delta Dc$ to the values of T901 to obtain the attained dispersion values T904. This is because the time response characteristic of the tunable dispersion compensating unit 652 is the one in the case where the time response characteristic shown in FIG. 7 is line-symmetrized with respect to the horizontal axis (or turned upside down).

The processor 682 adds $\Delta Dc$ to the compensated dispersion value T903 before correction to obtain the corrected compensated dispersion value T905.

Figure 11:
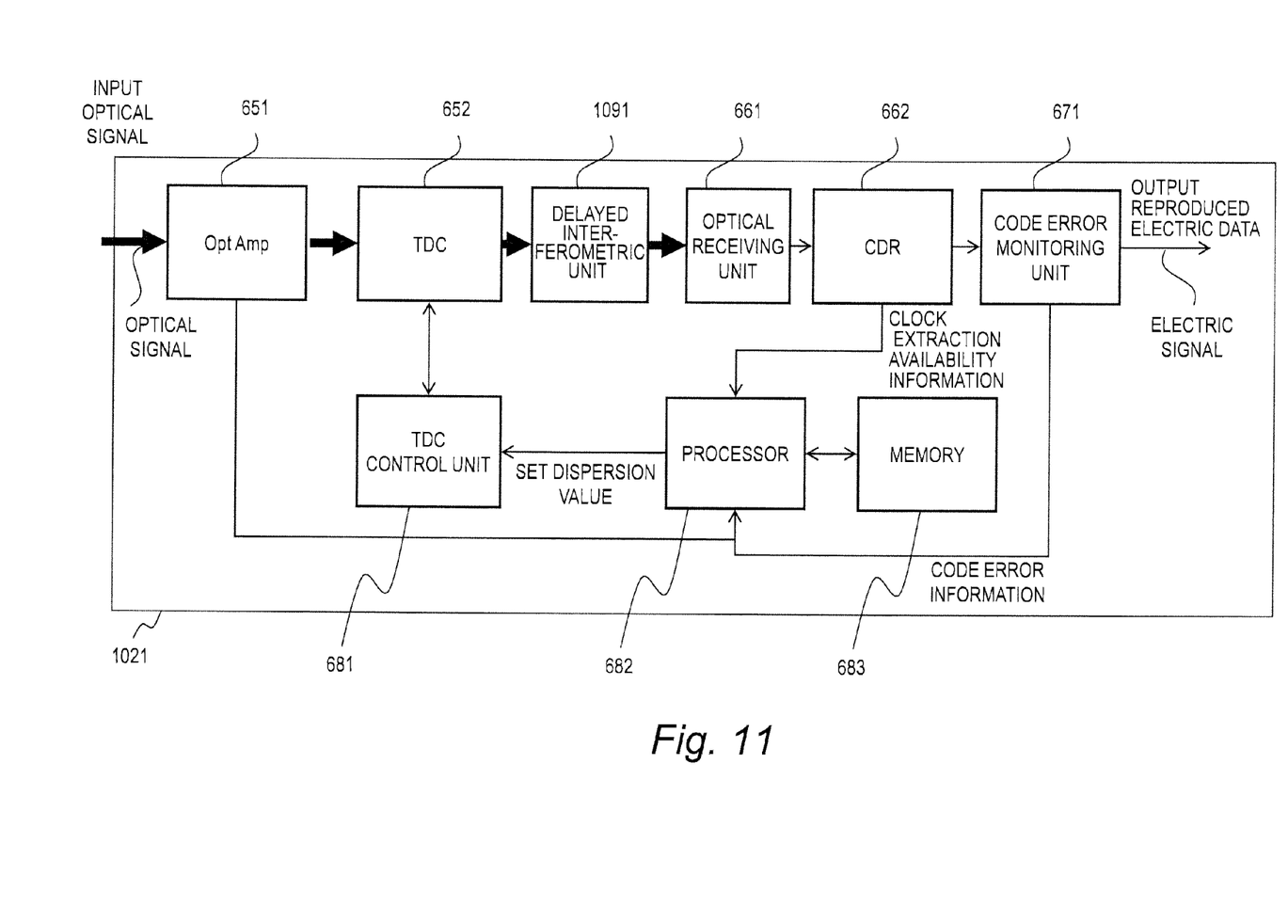
FIG. 11 is a block diagram illustrating a configuration of an optical transceiver according to a second embodiment of this invention.

FIG. 11 is a block diagram illustrating a configuration of an optical transceiver 1021 according to a second embodiment of this invention.

The optical transceiver 1021 in FIG. 11 is an apparatus in which a delayed interferometric unit 1091 added to the optical transceiver 221 in the first embodiment. The constituents same as those in the optical transceiver 221 in the first embodiment are denoted by the same reference signs and the explanations thereon are omitted.

In FIG. 11, the output of the tunable dispersion compensating unit 652 passes through the delayed interferometric unit 1091 and enters the optical receiving unit 661. The delayed interferometric unit 1091 is a delayed interferometer used in the aforementioned schemes of DPSK and DQPSK to enable acquisition of the optical intensity or phase of an optical signal. The detailed explanation on the delayed interferometric unit 1091 is omitted but the tuning of the delayed interferometric unit 1091 in this embodiment is a part of the tuning of the optical transceiver 1021 and performed at the step of S822 in FIG. 8.

According to the second embodiment, the optical transceiver 1021 using the delayed interferometric unit 1091 can implement the determination of the compensated dispersion value in the first embodiment.

As previously described, an optical node 103 in this embodiment determines the time to change the dispersion value in the tunable dispersion compensating unit 652 within a predetermined range to be the time $\Delta t$, which is unique to the tunable dispersion compensating unit 652, instead of the stabilization time $\Delta Ts$; accordingly, the time to obtain the compensated dispersion value is reduced. In addition, since the time $\Delta t$ is determined to be a shorter time than the stabilization time $\Delta Ts$, a proper compensated dispersion value can be set by using the difference between the target dispersion value and the amount of dispersion attained at the time $\Delta t$ as the correction value. Consequently, the time necessary to compensate for waveform degradation can be advantageously reduced to obtain a desired quality of main signal at an earlier occasion.

In determining the dispersion value, the optical transceiver 221 of this invention changes the dispersion value at a high speed and uses a correction value to set a proper compensated dispersion value, so that the time to determine the compensated dispersion value can be reduced; and as a result, the time necessary to compensate for the waveform degradation can be advantageously reduced to obtain a desired quality of main signal at an earlier occasion.

A representative aspect of this invention other than those described in the appended claims is as follows:

(1) In an aspect of this invention, provided is an optical receiver in which a compensation controller changes the dispersion value from a first dispersion value as an initial value into a second dispersion value as a target value then changes the dispersion value from the second dispersion value to the third dispersion value by setting the second dispersion value as an initial value and a third dispersion value as a target value, the third dispersion value is set so that the difference between the third dispersion value and the second dispersion value is equal to the difference between the second dispersion value and the first dispersion value, the first dispersion value is higher than the second dispersion value, the second dispersion value is higher than the third dispersion value, the clock extractor and the compensation controller repeatedly perform the process using a new initial value and a new target value, and the compensation controller determines a calculated dispersion value in a case where the created first extraction information indicates that the clock extraction is unavailable and the created second extraction information indicates that the clock extraction is available.

While the present invention has been described in detail and pictorially in the accompanying drawings, the present invention is not limited to such detail but covers various obvious modifications and equivalent arrangements, which fall within the purview of the appended claims.

What is claimed is:

1. An optical receiver comprising:
 a compensator configured to receive an optical signal, which is modulated by at least one of an optical intensity modulation scheme and a phase modulation scheme, and to compensate for dispersion of the received optical signal with a dispersion parameter within a predetermined range of dispersion values;
 a memory;
 a compensation controller configured to instruct the compensator to compensate for dispersion of the optical signal; and
 a clock extractor configured to extract the received optical signal into an electric signal and to create extraction information indicating whether a clock can be extracted from the electric signal, wherein
  the compensation controller is configured to select a first dispersion value and a second dispersion value differing by a predetermined value from each other out of the predetermined range of dispersion values,
  the compensation controller is configured to store, into the memory, a stabilization time necessary to change the dispersion parameter used in the compensator from the first dispersion value to the second dispersion value, a transition time shorter than the stabilization time, and a difference between a third dispersion value used after the transition time and the second dispersion value,
  the compensator is configured to compensate the received optical signal using the selected first dispersion value in a case where the extraction information indicates that the clock extraction is unavailable,
  the clock extractor is configured to create first extraction information indicating whether the clock can be extracted from the optical signal compensated using the first dispersion value,
  the compensation controller is configured to change the dispersion parameter used in the compensator from the first dispersion value into the second dispersion value as a target,
  the compensator is configured to compensate the received optical signal using the third dispersion value after the transition time has passed since a time when the dispersion parameter was started to be changed,
  the clock extractor is configured to create second extraction information indicating whether the clock can be extracted from the optical signal compensated using the third dispersion value, and
  the compensation controller is configured to cause the compensator to compensate for dispersion of the optical signal using a dispersion value calculated based on the second dispersion value and the difference between the third dispersion value and the second dispersion value in a case where the created first extraction information indicates that the clock extraction is unavailable and the created second extraction information indicates that the clock extraction is available.

2. The optical receiver according to claim 1, wherein
the compensation controller is configured to change the dispersion parameter used in the compensator from the first dispersion value as an initial value into the second dispersion value as a target value then changes the dispersion parameter used in the compensator from the second dispersion value to a fourth dispersion value by setting the second dispersion value as an initial value and a fourth dispersion value as a target value,
the fourth dispersion value is set so that the difference between the fourth dispersion value and the second dispersion value is equal to the difference between the second dispersion value and the first dispersion value,
the first dispersion value is lower than the second dispersion value,
the second dispersion value is lower than the fourth dispersion value,
the clock extractor and the compensation controller are configured to repeatedly perform a dispersion compensation using a new initial value and a new target value, and
the compensation controller is configured to determine the dispersion value which is calculated based on the stored value in the memory in a case where the created first extraction information indicates that the clock extraction is unavailable and the created second extraction information indicates that the clock extraction is available.

3. The optical receiver according to claim 2, w herein the compensation controller is configured to change the dispersion parameter used in the compensator to a target value with a predetermined time period after the compensation controller instructs the compensator to change the target value used in the compensator.

4. The optical receiver according to claim 1, further comprising a code error unit configured to detect a code error in an electric signal converted from the optical signal,
wherein the compensation controller is configured to change the dispersion parameter used in the compensator based on a result of code error detection by the code error unit.

5. The optical receiver according to claim 1, further comprising a delayed interferometer configured to detect a phase from the optical signal compensated by the compensation unit.

6. An optical transfer apparatus for transmitting and receiving an optical signal, comprising:
an optical amplifier for amplifying the optical signal;
an optical transceiver configured to receive an optical signal, which is modulated by at least one of an optical intensity modulation scheme and a phase modulation scheme, and to compensate the received optical signal with a dispersion parameter within a predetermined range of dispersion values; and
a multiplexer that switches the optical signal,
wherein the optical transceiver includes a memory,
wherein the optical transceiver is configured to:
select a first dispersion value and a second dispersion value differing by a predetermined value from each other out of the predetermined range of dispersion values;
store, into the memory, a stabilization time necessary to change the dispersion parameter used to compensate the received optical signal from the first dispersion value to the second dispersion value, a transition time shorter than the stabilization time, and a difference between a third dispersion value used after the transition time and the second dispersion value;
convert the received optical signal into an electric signal;
create extraction information indicating whether a clock can be extracted from the electric signal;
compensate the received optical signal using the first dispersion value in a case where the extraction information indicates that the clock extraction is unavailable;
create first extraction information indicating whether the clock can be extracted from the optical signal compensated using the first dispersion value;
change the dispersion parameter used to compensate the received optical signal from the first dispersion value into the second dispersion value as a target;
compensate the received optical signal using the third dispersion parameter after the transition time has passed since a time when the dispersion parameter was started to be changed;
create a second extraction information indicating whether the clock can be extracted or not from the optical signal compensated using the third dispersion value; and
compensate for the dispersion of the optical signal using a dispersion value which is calculated based on the second dispersion value and the difference between the third dispersion value and the second dispersion value in a case where the created first extraction information indicates that the clock extraction is unavailable and the created second extraction information indicates that the clock extraction is available.

* * * * *